Patented Nov. 10, 1942

2,301,802

UNITED STATES PATENT OFFICE 2,301,802

PROCESS OF DESULPHURIZING HYDROCARBONS

Robert E. Burk and Everett C. Hughes, Cleveland Heights, Ohio, assignors to The Standard Oil Company, Cleveland, Ohio, a corporation of Ohio No Drawing. Application September 9, 1939, Serial No. 294,206

5 Claims. (Cl. 196—28)

This invention relates to desulphurizing, and more particularly removal of sulphur from hydrocarbons. As is known, petroleum hydrocarbons when contacted with catalysts at temperatures above stability of the hydrocarbon molecule are converted into different hydrocarbon products including unsaturates and aromatics. We have now found that with certain compositions and conditions catalysts may be operated to selectively attack sulphur contained in hydrocarbons, and where desired, the operating conditions may be maintained outside of the range of hydrocarbon instability. Such process furthermore lends itself particularly well to manufacturing schedules involving production of hydrocarbon products and in which sulphur-containing materials have to be dealt with.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The stocks to be treated may be of any hydrocarbon stock of petroleum or coal origin. Operation may be carried on in vapor phase on stock suitable therewith, and it may be carried on in liquid phase with non-vaporized or heavy stocks. Catalysts suitable are such as involve particularly chromium oxide. Additional components may be included, such as alumina, and catalysts of 5-100 per cent of chromium oxide and 0-95 per cent of alumina are desirable, and particularly a composition range of 18-30 mol per cent of chromium oxide, as for instance 20:80 mol per cent chromium oxide and aluminum oxide respectively. Among other components which may in some instances be used with the chromium oxide however are oxides from the class consisting of iron, copper, and oxides of groups II, III and IV of the periodic table and aluminum silicate clays. The catalysts may be contacted with the hydrocarbons in convenient manner according to circumstances; it may be used in granular form in a bed through which hydrocarbon vapors are passed, and advantageously there may be two such beds in a series, one of which is partially spent and the other nearly fresh; or the catalyst may be used as a slurry in an oil; or it may be contacted as a suspension in the vapors. The operating conditions are usually maintained different from those suitable for attack upon the hydrocarbon molecule, these catalysts having activity in that direction if the conditions are appropriate therefor, and the process thus may be operated at temperatures outside of the cracking range or range in which there is hydrocarbon molecule instability, and the temperatures may be 200-850° F., and in particular 500-750° F., and pressures atmospheric or more, up to about 800 pounds.

A particularly desirable catalyst preparation and operation of the process may be illustrated as follows: A catalyst is prepared to contain 20 mol per cent of chromium oxide and 80 mol per cent of aluminum oxide, advantageously for instance by a two-stage precipitation such as by feeding at a rate of 600 cc. per minute a solution containing 6.4 mol aluminum nitrate, 1.6 mol chromium nitrate, and 960 g. of ammonium acetate per each 48 liters of solution, the solution being fed into a mixing zone of 600° cc. capacity where gaseous ammonia is also supplied at a rate to effect about 70 per cent neutralization, the over-flow from such mixing zone proceeding to another mixing zone of the same capacity into which a solution of 680 g. of concentrated ammonium hydroxide per 16 liters of water is also fed at a rate of 200 cc. per minute (this constituting 50 per cent of the theoretically required ammonia). From the second mixing zone the liquid flows to a filter and filtration is carried on. The catalyst is then dried, as for instance in an air oven at 140-150° F. for about 60 hours and is vacuum dried at about 425° F. for about 12 hours. The catalyst suitably subdivided and in well dried condition is subjected to elevated temperature, as for instance 575° F. and atmospheric pressure while a sour gasoline is passed in contact through the mass at a flow rate of 1 volume of the gasoline per volume of catalyst per hour. A gasoline having 0.023 per cent mercaptan sulphur thus showed reduction thereof to zero, leaving a sweet product.

Similarly, benzol and other vaporizable hydrocarbons may be passed through such catalyst beds, of composition just stated or of compositions otherwise as more generically set forth above. And, with non-vaporized material likewise, the catalytic contact may be provided in any of the forms indicated as desired. In general, flow rates of 0.1-10 gallons of liquid hydrocarbon per hour per gallon of catalyst are used.

In some instances it is of advantage to have hydrogen present in the reaction zone, and hydrogen or hydrogen-containing gases may be fed simultaneously. With this usage, pressures of 50-800 pounds per square inch are desirable.

Some stocks operate particularly desirably by passing the material through the catalyst contact as indicated, and then further subjecting the hydrocarbon to the action of iron carbonyl added in small amount, and the temperature being maintained at least 300° F. Where for any reason it is desired to avoid such rather high temperature, the hydrocarbon coming from the catalyst zone may be treated at lower temperatures, such as 60-100° F., with a caustic soda solution. Treatment by the catalytic contact and then by the iron carbonyl or caustic soda is not merely cumulative, but by reason of peculiarities in changes in sulphur compounds occurring in some stocks the total final action hereby is different from comparable actions of the reagents individually.

Catalysts in accordance with the invention are capable of continuous operation for reasonably long periods in contrast to the quick deterioration characteristic of catalytic operation in molecular break-down of hydrocarbons, but when the activity declines to an unprofitable point, the catalyst may readily be re-generated by treating with an oxidizing gas such as air or flue gas or nitrogen or inert gas mixture containing a few per cent of oxygen. In re-generating catalysts containing chromium it is desirable to avoid the presence of water vapor in the regenerating gases and to control the rate of re-generation so that the temperature does not go over 1100-1200° F. After such regeneration, the catalyst may again be put "on stream."

Other modes of applying the principle of the invention may be employed, change being made as regards the details described, provided the features stated in any of the following claims, or the equivalent of such, be employed.

We therefore particularly point out and distinctly claim as our invention:

1. A process of desulphurizing hydrocarbons, which comprises contacting a sulphur-containing hydrocarbon without addition of free hydrogen with a 20:80 mol per cent gel precipitated chromium and aluminum oxide catalyst, at a temperature of about 575° F.

2. A process of desulphurizing hydrocarbons, which comprises attacking sulphur compounds by contacting the sulphur-containing hydrocarbon with a catalyst characterized by containing gel precipitated oxides of chromium and aluminum in which the chromium oxide is 18-30 mol per cent, at a temperature below molecular rupture of the hydrocarbon and in the range of 200-950° F.

3. A process of desulphurizing hydrocarbons, which comprises attacking sulphur compounds by contacting the sulphur-containing hydrocarbon with a catalyst characterized by containing gel precipitated oxides of chromium and aluminum in which the chromium oxide is 18-30 mol per cent, at an elevated temperature below molecular rupture of the hydrocarbon and below 950° F.

4. A process of desulphurizing hydrocarbons, which comprises contacting a sulphur-containing hydrocarbon without addition of free hydrogen with a catalyst consisting of 20:80 mol per cent gel precipitated chromium and aluminum oxides, at a temperature above 200° F. and below the cracking of the hydrocarbon.

5. A process of desulphurizing hydrocarbons, which comprises contacting a sulphur-containing hydrocarbon without addition of free hydrogen with a catalyst consisting of 20:80 mol per cent gel percipitated chromium and aluminum oxides, at a temperature above 200° F. and below the cracking of the hydrocarbon, and then contacting the hydrocarbon with iron carbonyl.

ROBERT E. BURK.
EVERETT C. HUGHES.